(12) United States Patent
Gerhard et al.

(10) Patent No.: US 10,576,362 B2
(45) Date of Patent: Mar. 3, 2020

(54) CARD WITH MACHINE-READABLE MARKINGS, SYSTEM AND METHOD

(71) Applicant: PlayFusion Limited, Cambridge (GB)

(72) Inventors: Mark Michael Gerhard, Cambridge (GB); Riaan Henning Hodgson, Cambridge (GB); David Gomberg, Cambridge (GB)

(73) Assignee: PLAYFUSION LIMITED, Cambridge (GB)

( * ) Notice: Subject to any disclaimer, the term of this patent is extended or adjusted under 35 U.S.C. 154(b) by 0 days.

(21) Appl. No.: 16/023,666

(22) Filed: Jun. 29, 2018

(65) Prior Publication Data
US 2020/0001168 A1  Jan. 2, 2020

(51) Int. Cl.
*G06K 19/06* (2006.01)
*A63F 1/02* (2006.01)
*G06K 7/14* (2006.01)

(52) U.S. Cl.
CPC .............. *A63F 1/02* (2013.01); *G06K 7/1417* (2013.01); *G06K 19/06037* (2013.01); *G06K 19/06075* (2013.01)

(58) Field of Classification Search
CPC .. A63F 1/02; G06K 7/1417; G06K 19/06075; G06K 19/06037
See application file for complete search history.

(56) References Cited

U.S. PATENT DOCUMENTS 10,086,266 B2 * 10/2018 Linden ................. A63F 13/213
2011/0156350 A1 * 6/2011 Schulken ................. A63F 1/02
273/292

* cited by examiner

*Primary Examiner* — Seung H Lee
(74) *Attorney, Agent, or Firm* — Hauptman Ham, LLP

(57) ABSTRACT

A card includes a substrate having a first surface and a second surface opposite the first surface. The first surface has a first surface area. The card also includes an image area on the first surface. The image area has a second surface area less than the first surface area. The cars further includes a contrast region between the image area and an edge of the substrate. The contrast region is a solid border surrounding the image area. The card additionally includes a plurality of markings extending from the contrast region into the image area. Each marking of the plurality of markings arranged in a pattern such that the markings of the plurality of markings are separated from one another by a portion of the image area.

17 Claims, 10 Drawing Sheets

CARD WITH MACHINE-READABLE MARKINGS, SYSTEM AND METHOD

BACKGROUND

Some objects are identifiable based on a scanning of a barcode or a QR code. The presence of a barcode or a QR code on an object is readily apparent to attract scanning thereof. Barcodes and QR codes often stand out compared to other media that may be present on an object that is identifiable by way of bar code or QR code scanning.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
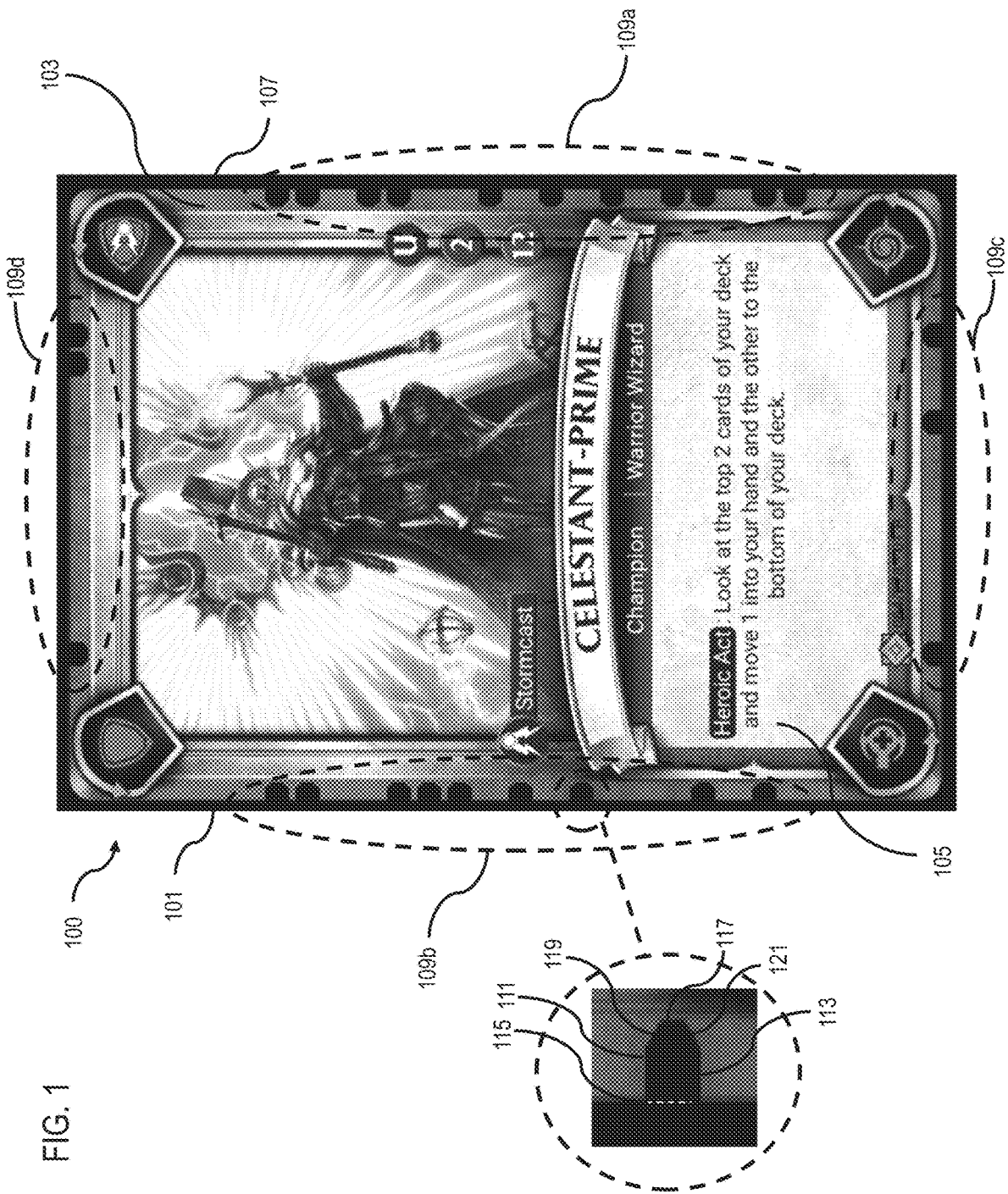
FIG. 1 is a diagram of a card, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the card or apparatus discussed herein in addition to the orientation depicted in the figures. The card or apparatus discussed herein may be otherwise oriented (rotated 90 degrees or at other orientations) and the spatially relative descriptors used herein may likewise be interpreted accordingly. Similarly, other relative terms, such as "first," "second," "third," and the like, may be used herein for ease of description to describe one element or feature's relationship to another element(s) or feature(s) as illustrated in the figures. In some embodiments, relative terms, such as "first," "second," "third," and the like, are not intended to imply a particular order. Such terms are instead intended to encompass different orientations of the card or apparatus in use or operation in addition to the orientations depicted in the figures. In some embodiments, relative terms, such as "first," "second," "third," and the like, imply an order of the different orientations of the card or apparatus discussed herein.

Barcodes and QR codes are often printed on articles to facilitate scanning and recognition thereof. Sometimes, a camera is used to capture an image, and software is used to process the image to enable recognition of an article that is included in the captured image.

Barcodes are often used as a basis upon which an article is capable of being identified. Barcodes are optical, machine readable, representations of data that involves a predefined series of consecutive variable thickness and distally spaced lines. When scanned by a device configured to recognize barcodes, barcodes provide a numerical value which may be either unique or generic within a range. The numerical values are capable of being cross-referenced with values in a database to identify an article associated with a recognized barcode.

Barcodes are simple markings that are often easily identifiable as an object to be scanned and often include black lines on a white background. Barcodes are widely adopted for storing data in one dimension, which is effectively binary across a width of the barcode. If a barcode is scanned at any point horizontally across a barcode, a device scanning the barcode receives a same data input. Barcodes are distinctive objects that prompt a user where to point an optical reading device and, as such, are intentionally distinct from the content they are intended to convey.

QR codes are scannable objects that convey information similar to barcodes. Unlike barcodes that simply have optical machine-readable information in a linear representation, QR codes include data in two dimensions. For QR codes, the entire object must be scanned, and values are attributed or afforded in both a horizontal and a vertical plane. When scanned by a device configured to recognize QR codes, a scanned QR code yields a numerical value that is capable of being cross-referenced with values in a database to identify an article associated with a recognized QR code. QR codes, like barcodes, are visually distinctive objects that that prompt a user where to point an optical reading device and, as such, are intentionally distinct from the content they are intended to convey.

Neither barcodes nor QR codes are intended to be hidden or obscured from a user. The purpose behind barcodes and QR codes is to provide a robust and easy method for a user to identify and scan a specific portion of an object.

FIG. 1 is a diagram of a card 100, in accordance with one or more embodiments. Card 100 includes an optical machine-readable representation of data embedded in an image. The optical machine-readable pattern comprises a plurality of markings that are capable of being identified by a device configured to scan an image of card 100, but that are incorporated into the card 100 in a manner that is less perceivable compared to a conventional barcode or QR code. The markings make it possible for the card 100 to include a visually stimulating image that includes machine-readable data capable of conveying information to a device configured to scan and process the data included in a captured image of the card 100.

In some embodiments, the card 100 is a playing card. In some embodiments, the card 100 is a business card. In some embodiments, the card 100 is a poster. In some embodiments, the card 100 is a picture. In some embodiments, the card 100 is a painting. In some embodiments, the card 100 is some other suitable article comprising a visually stimulating image with an optical machine-readable representation of data within an area of the image in such a manner as to not detract from the artistic aesthetic of the image, making it possible for the optical machine-readable data to be processed by a system capable of scanning and processing the optical machine-readable data without impacting an overall user experience in aesthetic terms.

Card 100 comprises a substrate 101 having a first surface 103, a second surface (not shown) opposite the first surface 103, and an image area 105 on the first surface 101. A contract region 107 is on the first surface 103 between the image area 105 and an edge of the substrate 101. The first surface 101 has a first surface area. The image area 105 has a second surface area less than the first surface area. The contrast region 107 is a solid border surrounding the image area 105. A plurality of markings 109 extend from the contrast region 107 into the image area 105. Each marking 109 is an irregular hexagon. The markings 109 are arranged in a pattern such that the markings 109 are separated from one another by a portion of the image area 105. In some embodiments, card 100 is usable in the context of a game. In some embodiments, data indicated by markings 109 is usable in the context of a game.

The contrast region 107 is a solid pattern having a color. The markings 109 have an identical solid pattern and color to that of the contrast region 107. In some embodiments, contrast region 107 comprises a pattern that is distinguishable by a machine and camouflaged with respect to the image area 105, and the markings 109 have a pattern identical to the contrast region 107. In some embodiments, contrast region 107 comprises a pattern that is distinguishable by a machine and camouflaged with respect to the image area 105, and the markings 109 have a pattern different from the contrast region 107. In some embodiments, contrast region 107 comprises a solid pattern, and the markings 109 have a camouflaged pattern with respect to the image area 105 that is distinguishable by a machine. In some embodiments, contrast region 107 has a camouflaged pattern with respect to the image area 105 that is distinguishable by a machine, and the markings 109 have a solid pattern.

Each marking 109 comprises a first side 111, a second side 113, a third side 115, a fourth side 117, a fifth side 119 and a sixth side 121. The first side 111 and the second side 113 are parallel. The first side 111 and the second side 113 have equal lengths extending in a first direction from the contrast region 107 into the image area 105. The third side 115 and the fourth side 117 are parallel. The third side 115 and the fourth side 117 extend in a second direction different from the first direction. The third side 115 connects the first side 111 with the second side 113. The third side 115 is greater in length than the fourth side 117. The fifth side 119 connects the first side 111 with the fourth side 117. The sixth side 121 connects the second side 113 with the fourth side 117. A center of the third side 115 is aligned with a center of the fourth side 117 in a direction perpendicular to the third side 115.

In some embodiments, one or more markings 109 comprises a rounded end, wherein the fourth side 117, fifth side 119 and sixth side 121 are replaced by an arch-shaped side connecting the first side 111 with the second side 113. In some embodiments, one or more markings 109 comprises a pointed end, wherein the fourth side 117, fifth side 119 and sixth side 121 are replaced by a two angled side that meet at a point connecting the first side 111 with the second side 113. In some embodiments, one or more markings 109 comprises a trapezoidal end, wherein the fourth side 117, fifth side 119 and sixth side 121 are replaced by a trapezoidal-shaped side connecting the first side 111 with the second side 113. In some embodiments, one or more markings 109 comprises a step-shaped end, wherein the fourth side 117, fifth side 119 and sixth side 121 are replaced by a series of steps connecting the first side 111 with the second side 113. In some embodiments, the series of steps rises from one side of the marking toward a center of the marking and falls toward an opposite side of the marking. In some embodiments, the series of steps rises from one side of the marking to the other. In some embodiments, one or more markings 109 comprises a slanted end, wherein the fourth side 117, fifth side 119 and sixth side 121 are replaced by an angle side connecting the first side 111 with the second side 113, where first side 111 or second side 113 is longer than the other. In some embodiments, one or more markings 109 comprises a rounded end, wherein the fourth side 117, fifth side 119 are angled with respect to the first side 111 and the second side 113, and the sixth side 121 is replaced by an arch-shaped side connecting the fourth side 117 with the fifth side 119. In some embodiments, one or more of the markings 109 is trapezoidal, octagonal, triangular, rhombic, square, rectangular, circular, elliptical, oval, or some other suitable shape. In some embodiments, one or more markings 109 is perpendicular to the contrast region 107. In some embodiments, one or more markings 109 is angled with respect to the contrast region 107.

Card 100 has at least three sides. Markings 109 are arranged along at least one of the at least three sides. In some embodiments, markings 109 are arranged along each of the at least three sides. In some embodiments, markings 109 are divided into at least three subsets 109a-109n that each correspond to one of the at least three sides. In some embodiments, the pattern of the markings 109 included in each of the at least three subsets 109a-109n is identical among the at least three subsets. In some embodiments, the pattern of the markings 109 included in each of the at least three subsets 109a-109n is different among at least two of the at least three subsets. In some embodiments, the pattern of the markings 109 included in each of the at least three subsets 109a-109n is different among each of the at least three subsets.

In some embodiments, card 100 comprises a substrate 101 having the at least three sides. In some embodiments, the substrate 101 has at least four sides. In some embodiments, the substrate 101 has at least six sides. In some embodiments, the substrate 101 has at least eight sides. In some embodiments, the substrate 101 is circular, oval, or otherwise curved such that the substrate has one or two sides.

In some embodiments, the card 100 comprises an equal quantity of sides as the substrate 101. In some embodiments, the card 100 comprises a greater quantity of sides than sides of the substrate 101. For example, if the substrate 101 has four sides, the card 100 optionally has eight sides, defined by a border on the substrate 101. In some embodiments, the card 100 comprises a lesser quantity of sides than sides of the substrate 101. For example, if the substrate 101 has four sides, the card 100 optionally has three sides, defined by a border on the substrate 101.

In some embodiments, a quantity of subsets 109a-109n of markings 109 is equal to a quantity of sides of the card 100 or the substrate 101. In some embodiments, a quantity of subsets 109a-109n of markings 109 is greater than a quantity of sides of the card 100 or the substrate 101. In some embodiments, a quantity of subsets 109a-109n of markings 109 is less than a quantity of sides of the card 100 or the substrate 101.

The card 100 has at least one default orientation. In some embodiments, the card 100 has at least two orientations inclusive of the default orientation. In some embodiments, the at least two orientations are exclusive of the default orientation. In some embodiments, card 100 has at least three orientations. In some embodiments, the at least three orientations are inclusive of the default orientation. In some embodiments, the at least three orientations are exclusive of the default orientation. In some embodiments, each orientation of the card 100 has an effect in the context of the game with which the card 100 is associated. In some embodiments, each orientation of the at least two orientations has an effect in the context of the game with which the card 100 is associated. In some embodiments, each orientation of the at least three orientations has an effect in the context of the game with which the card 100 is associated. In some embodiments, a card 100 free from having more than a default orientation is free from having an effect in the context of the game with which the card 100 is associated.

The substrate 101 comprises paper, plastic, glass, ceramic, vinyl, wood, metal, or some other suitable material. In some embodiments, the card 100 is viewable by way of a display. In some embodiments, substrate 101 is virtually represented by a display. In some embodiments, a computer system or mobile device comprising or communicatively coupled to a computer or processor-based system such as system 500 (FIG. 5) is configured to cause the card 100 to be viewable by way of a display associated with a computer, mobile device, having connectivity to the computer system or mobile device, or a combination thereof.

In some embodiments, the image area 105 includes a graphic that corresponds to a title of the card 100 or a card type. In some embodiments, card 100 is a buff card, a passive card, an action card, a hero card, a character card, a weapon card, health card, a defense card, location card, a vehicle card, an equipment card, or some other suitable type of card. In some embodiments, the markings 109 are indicative of the title of the card 100, the type of the card 100, an orientation of the card 100, or indicative of some other suitable information. In some embodiments, markings 109 are indicative of a unique identifier assigned to card 100. In some embodiments, the unique identifier is a serial number.

In some embodiments, the card 100 is one of a plurality of cards 100 that together make up a deck of cards 100. The deck of cards 100 includes at least two different types of cards 100, wherein a first card 100 included in the deck of cards 100 has at least one orientation, and a second card 100 included in the deck or cards 100 has at least two orientations. In some embodiments, the deck of cards 100 includes at least two different types of cards 100, wherein a first card 100 included in the deck of cards 100 has at least one orientation, and a second card 100 included in the deck of cards 100 has at least three orientations. In some embodiments, the deck of cards 100 includes at least two different types of cards 100, wherein a first card 100 included in the deck of cards 100 has at least two orientations, and a second card 100 included in the deck of cards 100 has at least three orientations. In some embodiments, the deck of cards 100 includes at least three different types of cards 100, wherein a first card 100 included in the deck of cards 100 has at least one orientation, a second card 100 included in the deck of cards 100 has at least two orientations, and a third card 100 included in the deck of cards 100 has at least three orientations. In some embodiments, one or more of the cards 100 included in the deck of cards has a different quantity of sides than the other cards 100 included in the deck of cards. In some embodiments, all of the cards 100 included in the deck of cards have an equal quantity of sides.

Figure 2:
FIG. 2 is a card, free from having an optical machine-readable representation of data, in accordance with one or more embodiments.

FIG. 2 is a card 200, in accordance with one or more embodiments. Card 200 is identical to card 100 (FIG. 1), but card 200 is free from having an optical machine-readable representation of data such as markings 109 (FIG. 1) included in card 100.

Figure 3:
FIG. 3 is a side-by-side comparison of a card with and without optical machine-readable markings, in accordance with one or more embodiments.

FIG. 3 is a side-by-side comparison of card 100 and card 200, in accordance with one or more embodiments. In some embodiments, card 200 is generated by an image processing system by overlaying markings 109 (FIG. 1) over the image area 105 (FIG. 1) of card 100. In some embodiments, card 200 is generated by an image processing system by extending contrast region 107 (FIG. 1) in a manner that creates markings 109 (FIG. 1) such that markings 109 extend into the image area 105 (FIG. 1) of card 100. In some embodiments, card 200 is generated by some other suitable process.

Side-by-side, markings 109 are very visible. But, when viewed in the abstract, the markings 109 are relatively innocuous and mildly imperceptible to a user. Markings 109 are usable to indicate an orientation of the card 100 in one or more of the real world, in a virtual world, the context of a game associated with the card 100, or for purposes of scanning card 100. In some embodiments, the subsets 109a-109n of markings 109 on each side of the card 100 are different and are usable to convey unique data, useful for determining an orientation of the card 100.

Figure 4:
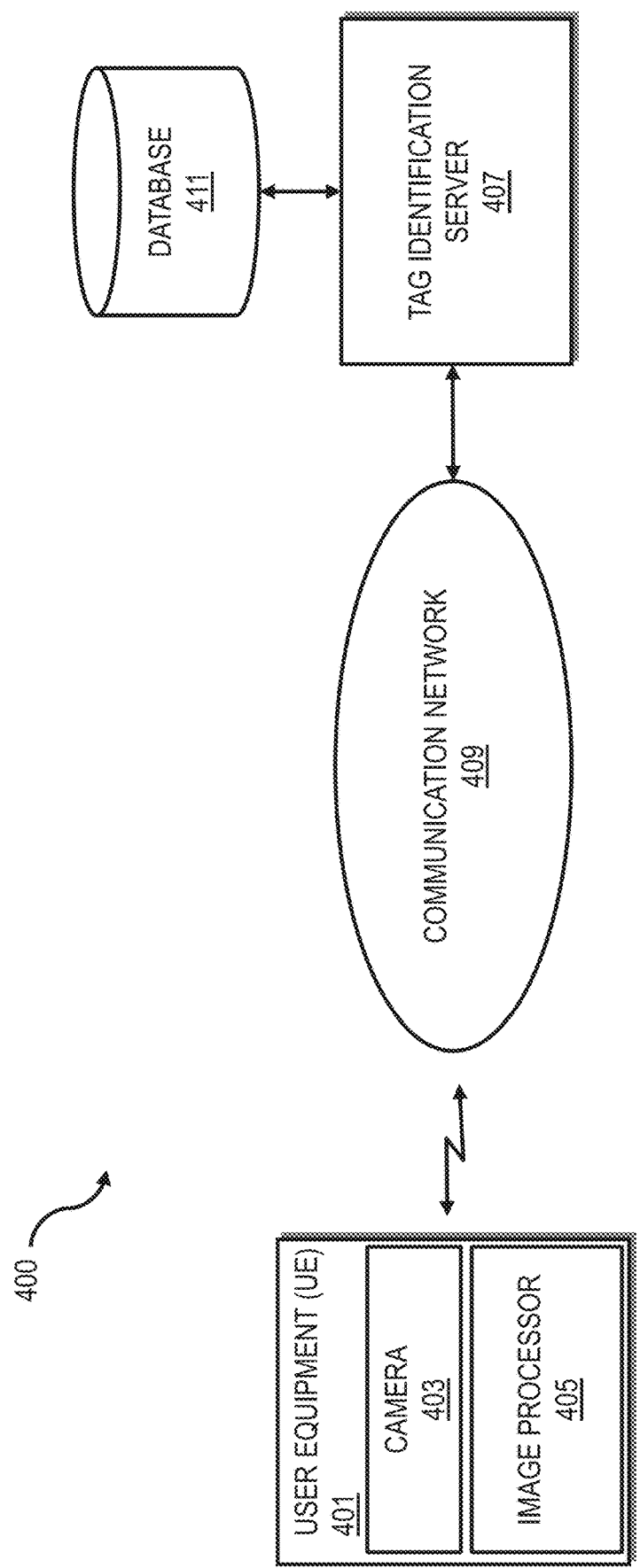
FIG. 4 is a diagram of a system configured to scan and process an optical machine-readable representation of data, in accordance with one or more embodiments.

FIG. 4 is a diagram of a system 400 configured to scan and process an optical machine-readable representation of data such as that included in card 100, in accordance with one or more embodiments. System 400 comprises user equipment 401 (UE 401) having a camera 403 and an image processor 405, a tag identification server 407 communicatively coupled with UE 401 by way of a communication network 409, and a database 411 communicatively coupled with tag identification server 407.

System 400 makes it possible to identify and process optical machine-readable representation of data in less than ideal conditions, like low light or an image of an article having the optical machine-readable representation of data being at an angle.

Compared with conventional barcode or QR code scanning and processing the systems, the system 400 is configured to scan, identify and process optical machine-readable representation of data such as that included in card 100 (FIG. 1) which is difficult compared to scanning, identifying and processing conventional barcodes or QR codes. The card 100, for example, has numerous colors or grayscales that are intertwined with or overlaid by the optical machine-readable representation of data such included card 100 which inherently provides more data for the system 400 to recognize than if the system 400 were to scan an image of a conventional and relatively simplistic barcode or QR code. The system 400 is capable of scanning and processing an image including an optical machine-readable representation of data that is not fixed in size like a conventional barcode or QR code. Additionally, the system 400 is capable of scanning and processing an image including an optical machine-readable representation of data in low-light, angular image capture, or other less than ideal recognition conditions that would place a burden on conventional scanning systems resulting in higher processing loads when a conventional scanning device scans and processes a discrete barcode or QR code.

In some embodiments, system 400 is configured to generate a point cloud of data points for an image captured by the UE 401. In some embodiments, system 400 generates the point cloud of datapoints using a binary robust invariant scalable key (BRISK) process. The point cloud of data points for the image is then compared to a pre-stored database to initially recognize the image as one that should be recognized. In some embodiments, system 400 performs a rough match of the image. In some embodiments, the system 400 uses a fast library for approximate nearest neighbors (FLANN) method to perform the rough match of the image. The rough match is then filtered using homographic techniques to make a more complete and finer match by, for example, mapping of a planar surface between two camera views.

The system 400 is configured to scan an image of a card such as card 100 and identify a series of markings such as the nearly imperceptible markings 109 (FIG. 1) included in card 100.

Markings 109 are positioned around the periphery of the image area 105 of card 100, with spacing therebetween that allows system 400 to recognize that it is looking at an image that is capable of being discovered in database 411. System 400 processes the markings 109, determines data that the markings are configured to convey, and cross-references the data with the database 411 to identify a match in the database 411. Based on a determination that a match exists, the system 400 is configured to output information stored in the database 411 corresponding to the scanned image.

In some embodiments, system 400 is configured to conduct one or more error correction processes and adjustments to an image captured by camera 403 to account for false positives in less than ideal conditions. The geometry of markings 109 reduce the likelihood of a false positive by improving the ability of system 400 to discern the markings 109 in less than ideal image capture conditions.

In some embodiments, system 400 is configured to scan and store image information in database 411 based on unique fingerprint information derived from an image captured by camera 403 and one or more patterns of markings 109 on card 100 included in the image of card 100. The image and markings together make it possible for an individual item to have a unique fingerprint or identity in the database 411.

In some embodiments, the system 400 is configured to cause a card 100 to be claimed in the context of system 100 based on a scanning of a card 100. For example, if a card 100 is scanned and recognized by the system 400, system 400 is configured to make note in the database 411 regarding the first user or instance that a card 100 is scanned. Then, if a subsequent user later scans the same card, the system 400 optionally outputs a result that is different from an output generated as a result of a first scanning. In some embodiments, the system 400 is configured to recognize that a card 100 has previously been scanned and, as a result, cause an output that indicates that card has already been scanned to be communicated to a user by way of UE 401 or some other suitable channel.

In some embodiments system 400 is configured to facilitate building user profiles and storing the user profiles in database 411. For example, in some embodiments, system 400 is configured to apply one or more data combination methods to cross-reference a scanning output and store results in database 411. In some embodiments, cards, codes and combinations thereof that are claimed based on a scanning event are added to the database 411 to build a user profile for a user associated with the scanning event. The system 400 is configured to create an output or experience for that user, based on the user profile and one or more design parameters. In some embodiments, system 400 makes it possible for a user to "claim" unique cards 100 in a collectible card game and then use or play the claimed cards 100 online. The experience will be unique to the user, as a code that is generated and stored in database 411 is unique to the user. A claimed code makes it possible to improve a user's experience with the system 400 by way of reciprocal feedback. In some embodiments, the reciprocal feedback is a provision of a prize or some other suitable output based on a determination by system 400 that a collection of cards 100 included in a set of cards has been completed.

In some embodiments, a virtual representation of the claimed code is capable of being varied so that a virtual item collection can upgrade itself or improve using a gaming mechanic. For example, a physical card 100 in the world has a static value—and output in most instances. However, if a user meets certain parameters, the system 400 is configured to recognize these parameters and alter or vary a user's experience with the system 400 based on a scanning of a card 100.

For example, if a user is a basic user and scans a poster in a train station, the system 400 optionally causes a simple output to be displayed such as basic information about the scanned poster. But, if the user is a premium user, then the system 400 optionally causes a premium animation or discount code to be displayed. In some embodiments, system 400 is configured to use this same data to create a customized experience. For example, a user may tag their "home" train station and, each time the visits their home train station, the home train station is logged by system 400 in database 411, which results in a loyalty bonus. In another example, the system 400 is configured to determine if a user scanned a same poster having distinct fingerprints or patterns of markings in different locations. The system 400 is configured to recognize that the locations are distinct and produces an output to a user as a reward for accomplishing a system-assigned task such as "get to 10 unique locations and win a prize".

In some embodiments, system 400 is configured to scan and process multiple codes simultaneously. Conventional barcodes and QR codes are single image objects that are optical triggers for producing an output. The markings 109 included in card 100 make it possible for system 400 to scan and process an image of card 100 and process multiple machine-readable codes based on markings 109. By processing multiple codes simultaneously, system 400 makes it possible to vary an output based on the number of machine readable codes presented to the machine as optical input at one time. For example, if two cards 100 having "knights" in the image area 105 thereof are placed next to one another on a table, system 400 is configured to scan and recognize the two "knight" cards 100 and cause an augmented reality animation to be displayed based on the two "knight" cards 100 being recognized by system 400. In this example, system 400 is configured to use the proximity of the "knight" cards 100 as a basis for varying the output, for example, so that the "knights" play a fight animation in the augmented reality display. In some embodiments, system 400 makes it possible for the cards 100 to be uniquely tagged such that the cards 100 have a virtualized status which can influence an outcome in the context of a game. For example, if the two "knights" in this example look identical, but one was claimed a longer time ago, the system 400 is configured to consider the older "knight" card 100 to be more experienced, and more likely to "win" an augmented reality battle between the two "knight" cards. In some embodiments, system 400 is configured to cause an augmented reality display that is based on one or more of an order by which two or more cards are scanned, a location or order of locations in which one or more cards are scanned, a time of day in which or order by which one or more cards are scanned. In some embodiments, system 400 is configured to cause an augmented reality display to be output based on a simultaneous scanning of two or more cards. In some embodiments, system 400 is configured to vary an augmented reality display based on a combination of one or more of simultaneous scanning, location, time of day, order of scanning, order of locations, or some other suitable basis upon which a decision for outputting and/or varying a display of data associated with one or more cards 100 is capable of being made.

System 400 is configured to apply a dual error checking methodology when scanning and processing an image of card 100. UE 401 is configured to perform an 8-bit check on the client side, which is a rough check. Then, tag identification server 407 processes one or more error checks that are more thorough than the rough check performed by UE 401. Dividing the error checking between UE 401 and tag identification server 407 helps to reduce the burden on UE 401 system resources that processing an image having multiple colors, size definitions and mildly imperceptible markings 109, captured in less than ideal environmental conditions, might otherwise impose on a processing system. System 400 is configured to reduce the burden on UE 401 by using tag identification server 407 to check identified codes in a captured image of card 100 to reduce the workload imposed on the CPU of UE 401, reduce heat output, reduce power consumption, reduce battery usage, etc.

The divided processing, in some embodiments, helps a user have a more seamless experience, while also allowing for checking to avoid manipulation or gaming of the system. It also involves two processes, the initial recognition (e.g., a determination that an input image is one that the system 400 is capable of recognizing) and then tracking (e.g., a determination that the system 400 should track this image as it has been recognized as being associated with some data stored in database 411). This multi-staged approach improves client-side efficiency, and makes it possible to tag an image, follow it, error correct, and locate a unique tag.

In some embodiments, a unique identifier capable of being discerned based on markings 109 is 40 bits in size. In some embodiments, the unique identifier is a tag. Establishing a 40-bit sized identifier makes it possible for a batch of unique identifiers to have 1,099,511,627,776 unique identifiers per batch. In some embodiments, system 400 is configured to allow 536,870,912 identifiers per batch (i.e., 29 bits) to help prevent guessing attacks on the system. In some embodiments, a unique identifier bit space contains 8 bits of dedicated error code that is dealt with by UE 401. In some embodiments, the bit space dedicated to the error code is included so that the UE 401 processes are capable of discarding as many incorrect readings as possible without burdening the tag identification server 407 the server process. In some embodiments, the error code is a XOR checksum.

This allows UE 401 use a modest amount of data to discard as many incorrect readings as possible without having to communicate with the tag identification server 407, helping to improve the efficiency of system 400.

In some embodiments, a unique identifier capable of being discerned based on markings 109 is a 56-bit unique ID comprising 8 bits of error checking, 8 bits of 'batch' identifier, and 40 bits of identifier. In some embodiments, the bit count of the tag and method is not fixed, and the quantity of bits is greater than or less than 56-bits, and/or the quantity of bits included in the various portions thereof are some other suitable quantity.

In some embodiments, the image area 105 of card 100 is known to system 400. The markings 109 are arranged in a pattern that is known to system 400. Each image area 105 has a predefined layout of markings 109 on the image area 105 that is unique to an individual card 100. In some embodiments, the predefined layout of markings 109 is the same among multiple cards 100. In some embodiments, a known layout of markings 109 is capable of being identified based on a shape of the markings, a position, and an angle of one or more marking 109s. In some embodiments, a layout of markings 109 comprises one marking 109 for each bit in a unique identifier.

Figure 5:
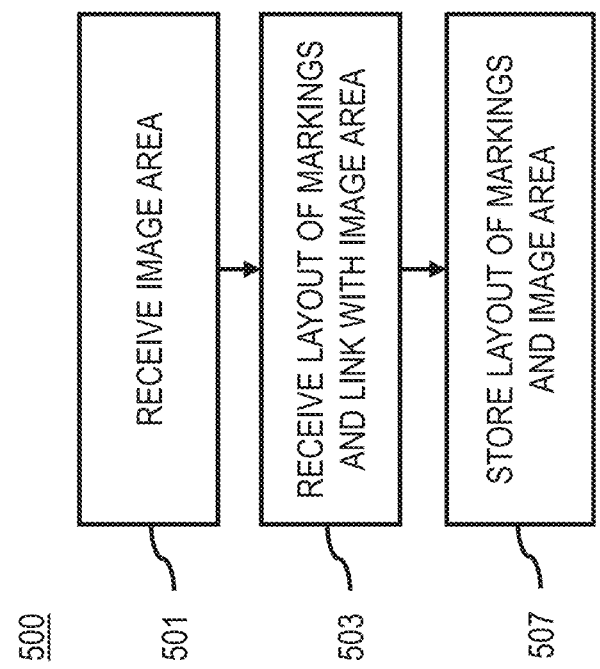
FIG. 5 is a flowchart of a method of generating a card, in accordance with one or more embodiments.

FIG. 5 is a flowchart of a method 500 of generating a card such as card 100 (FIG. 1), in accordance with one or more embodiments. In some embodiments, method 500 is performed by one or more of UE 401 or tag identification server 407 included in system 400 (FIG. 4).

In step 501, one or more of an image of card 200 including the contrast region 107 or an image of the image area 105 of card 200 is received by tag identification server 407. In step 503, a layout of markings is received by tag identification server 407 and the tag identification server 407 links the layout of markings to the received image of card 200. In step 505, the layout of markings and the image of card 200 are stored in database 411 by tag identification server 407.

In optional step 507, tag identification server 407 processes the image of card 200 and the layout of markings to generate one or more of a printable or displayable image for card 100 having markings extending from contrast region 107 into image area 105.

Figure 6:
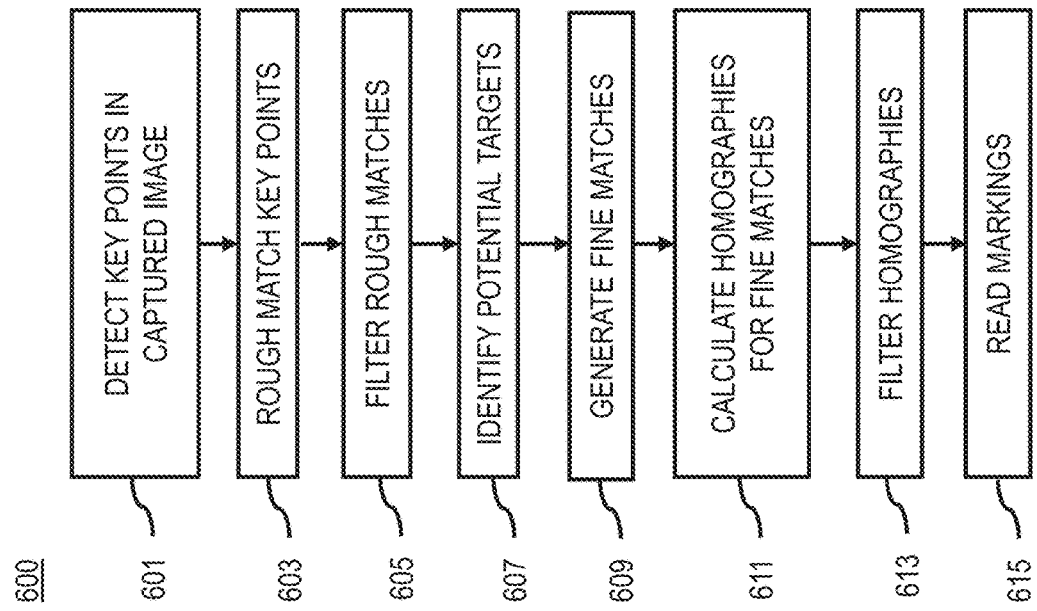
FIG. 6 is a flowchart of a method of processing an image of a card, in accordance with one or more embodiments.

FIG. 6 is a flowchart of a method 600 of processing an image of a card such as card 100 (FIG. 1), in accordance with one or more embodiments. In some embodiments, method 600 is performed by one or more of UE 401 or tag identification server 407 included in system 400 (FIG. 4).

In step 601, binary robust invariant scalable key points in the image are detected. In step 603, the key points are rough matched using a fast library for approximate nearest neighbors method to generate the rough matches. In step 605, the rough matches are filtered. In step 607, a quantity of rough matches identified as being within a predetermined threshold of a match are picked and stored in a database as potential targets. In step 609, fine matches are generated based on a fine matching process performed on the key points using the potential targets. In step 611, homographies for the fine matches are calculated. In step 613, the homographies are filtered. In step 615, the markings are read.

Figure 7:
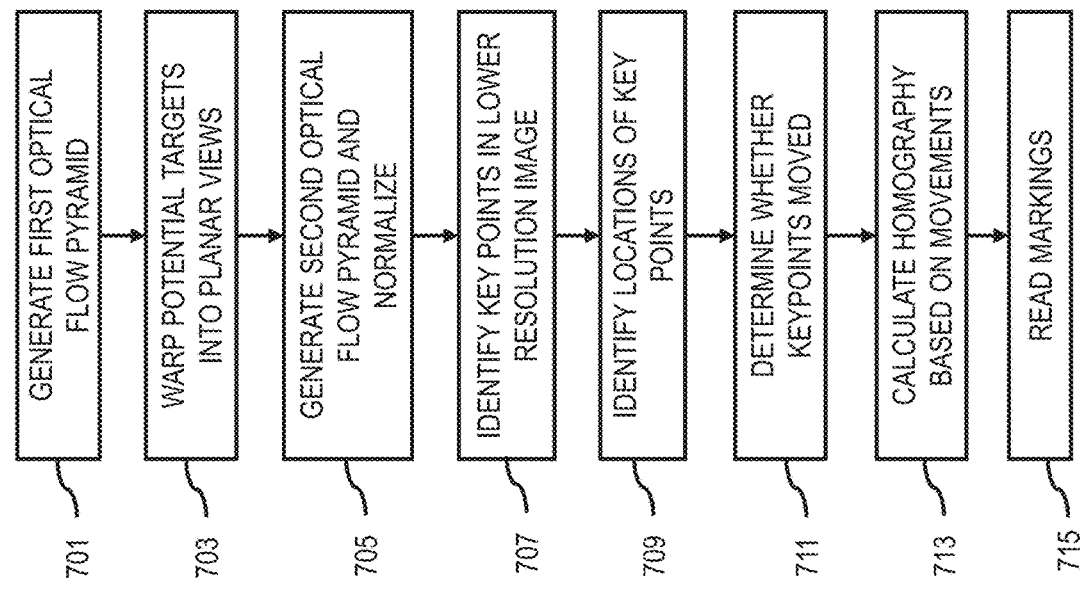
FIG. 7 is a flowchart of a method of processing an image of a card, in accordance with one or more embodiments.

FIG. 7 is a flowchart of a method 700 of processing an image of a card such as card 100 (FIG. 1), in accordance with one or more embodiments. In some embodiments, method 700 is performed by one or more of UE 401 or tag identification server 407 included in system 400 (FIG. 4).

In step 701, one or more first optical flow pyramids are generated based on the potential targets using a lower resolution version of the potential targets. In step 703, the image is warped into one or more planar views of the potential targets. In step 705, a second optical flow pyramid of the warped image is generated, and one or more layers of the second optical flow pyramid is/are normalized. In step 707, the key points in the lower resolution of the potential targets are identified. In step 709, locations of the key points in the warped image are identified. In step 711, a determination is made regarding where the key points moved, if at all, between one or more of the first optical flow pyramids and the second optical flow pyramid by running an optical flow calculation, and the determined movements are filtered. In step 713, a homography is calculated based on the determined movements, or lack thereof. In step 715, a second mark reading process is run.

In some embodiments, a process implementing method 700 is run in series after a process implementing method 600. In some embodiments, a process implementing method 600 is faster than a process implementing method 700.

Figure 8:
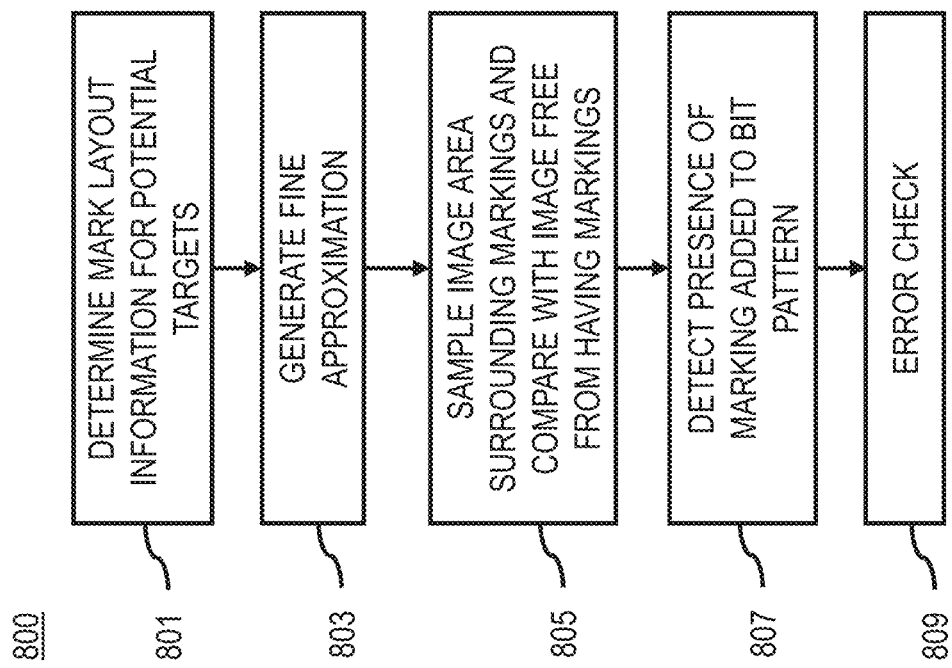
FIG. 8 is a flowchart of a method of processing an image of a card, in accordance with one or more embodiments.

FIG. 8 is a flowchart of a method 800 of processing an image of a card such as card 100 (FIG. 1), in accordance with one or more embodiments. In some embodiments, method 800 is performed by one or more of UE 401 or tag identification server 407 included in system 400 (FIG. 4).

In step 801, mark layout information is determined for the potential targets. In step 803, a fine approximation is generated for each marking in the mark layout. In step 805, for each marking, the image in the area of the marking is sampled, normalized, and compared with an area of the image free from having the marking. In step 807, a detected presence of a marking is added to a bit pattern. In step 809, an error checking code for the bit pattern is calculated to eliminate a potential false positive.

Figure 9:
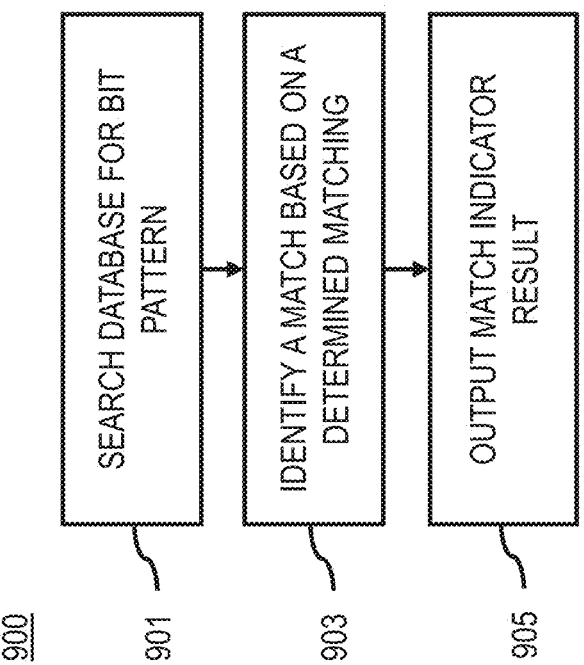
FIG. 9 is a flowchart of a method of processing an image of a card, in accordance with one or more embodiments.

FIG. 9 is a flowchart of a method 900 of processing an image of a card such as card 100 (FIG. 1), in accordance with one or more embodiments. In some embodiments, method 900 is performed by one or more of UE 401 or tag identification server 407 included in system 400 (FIG. 4).

In step 901, database 411 is searched for the bit pattern. In step 903, based on a match existing in the database 411, the match is identified. In step 905, a match result indicator is output to a device associated with a camera that captured the image of card 100.

In some embodiments, processes implementing methods 600, 700 and 800 are performed by UE 401 and a process implementing method 900 is performed by tag identification server 407.

Figure 10:
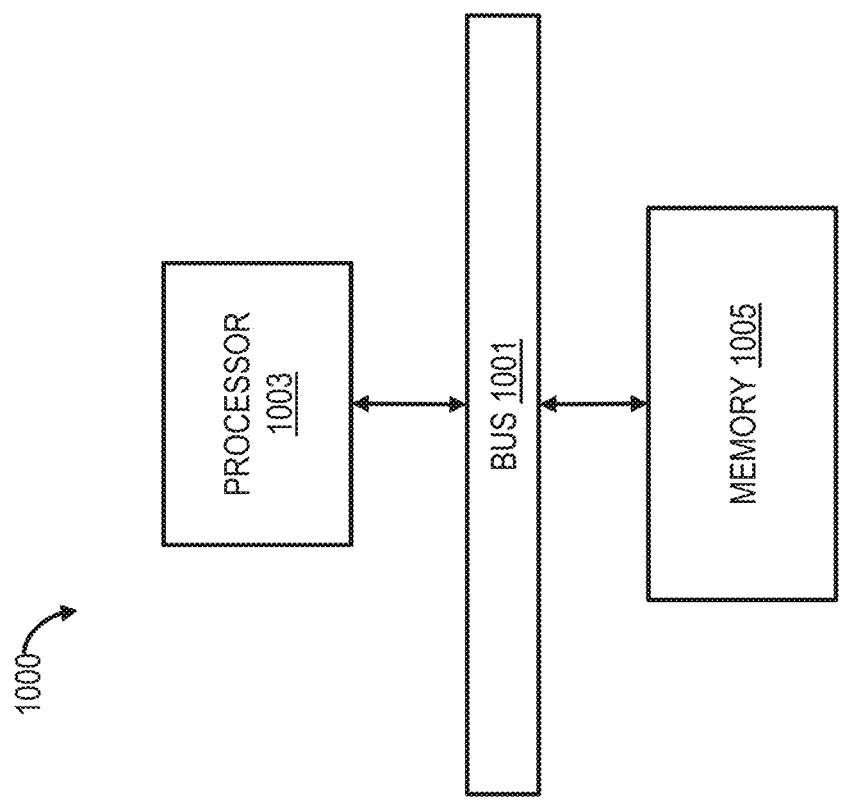
FIG. 10 is a functional block diagram of a computer or processor-based system upon which or by which an embodiment is implemented.

FIG. 10 is a functional block diagram of a computer or processor-based system 1000 upon which or by which an embodiment is implemented. In some embodiments, one or more of UE 401 (FIG. 4) or tag identification server 407 (FIG. 4) is implemented by a processor-based system such as system 1000.

Processor-based system 1000 is programmed to cause a card such as card 100 (FIG. 1) to be displayed and/or processed as described herein, and includes, for example, bus 1001, processor 1003, and memory 1005 components.

In some embodiments, the processor-based system is implemented as a single "system on a chip." Processor-based system 1000, or a portion thereof, constitutes a mechanism for performing one or more steps of causing a card to be displayed and/or processed.

In some embodiments, the processor-based system 1000 includes a communication mechanism such as bus 1001 for transferring information and/or instructions among the components of the processor-based system 1000. Processor 1003 is connected to the bus 1001 to obtain instructions for execution and process information stored in, for example, the memory 1005. In some embodiments, the processor 1003 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1003. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1003 performs a set of operations on information as specified by a set of instructions stored in memory 1005 related to causing a card to be displayed and/or processed. The execution of the instructions causes the processor to perform specified functions.

The processor 1003 and accompanying components are connected to the memory 1005 via the bus 1001. The memory 1005 includes one or more of dynamic memory (e.g., RAM, magnetic disk, writable optical disk, etc.) and static memory (e.g., ROM, CD-ROM, etc.) for storing executable instructions that when executed perform the steps described herein to cause a card to be displayed and/or processed. The memory 1005 also stores the data associated with or generated by the execution of the steps.

In one or more embodiments, the memory 1005, such as a random access memory (RAM) or any other dynamic storage device, stores information including processor instructions for causing a card to be displayed and/or processed. Dynamic memory allows information stored therein to be changed by system 1000. RAM allows a unit of information stored at a location called a memory address to be stored and retrieved independently of information at neighboring addresses. The memory 1005 is also used by the processor 1003 to store temporary values during execution of processor instructions. In various embodiments, the memory 1005 is a read only memory (ROM) or any other static storage device coupled to the bus 1001 for storing static information, including instructions, that is not changed by the system 1000. Some memory is composed of volatile storage that loses the information stored thereon when power is lost. In some embodiments, the memory 1005 is a non-volatile (persistent) storage device, such as a magnetic disk, optical disk or flash card, for storing information, including instructions, that persists even when the system 1000 is turned off or otherwise loses power.

The term "computer-readable medium" as used herein refers to any medium that participates in providing information to processor 1003, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to a card. The card comprises a substrate having a first surface and a second surface opposite the first surface. The first surface has a first surface area. The card also comprises an image area on the first surface. The image area has a second surface area less than the first surface area. The cards further comprises a contrast region between the image area and an edge of the substrate. The contrast region is a solid border surrounding the image area. The card additionally comprises a plurality of markings extending from the contrast region into the image area. Each marking of the plurality of markings is arranged in a pattern such that the markings of the plurality of markings are separated from one another by a portion of the image area.

Another aspect of this description is related to a method. The method comprises processing an image captured by a camera. The processing comprises a first process, a second process, a third process and a fourth process.

The first process comprises detecting binary robust invariant scalable key points in the image. The first process also comprises rough matching on the key points using a fast library for approximate nearest neighbors method to generate rough matches. The first process further comprises filtering the rough matches. The first process additionally comprises picking a quantity of rough matches identified as being within a predetermined threshold of a match and storing the rough matches identified as being within the predetermined threshold of the match as potential targets in a database. The first process also comprises running a fine match on the key points using the potential targets to generate fine matches. The first process further comprises calculating first homographies for the fine matches. The first process additionally comprises filtering the first homographies. The first process also comprises running a first mark reading process.

The second process comprises generating one or more first optical flow pyramids based on the potential targets using a lower resolution version of the potential targets. The second process also comprises warping the image into one or more planar views of the potential targets. The second process further comprises generating a second optical flow pyramid of the warped image, and normalizing one or more layers of the second optical flow pyramid. The second process further comprises identifying the key points in the lower resolution of the potential targets. The second process additionally comprises identifying where the key points are located in the warped image. The second process also comprises determining the key points moved between one or more of the first optical flow pyramids and the second optical flow pyramid by running an optical flow calculation and filter the determined movements. The second process further comprises calculating a second homography based on the determined movements and running a second mark reading process.

The third process comprises determining mark layout information for the potential targets. The third process also comprises generating a fine approximation for each marking in the mark layout. The third process further comprises, for each marking, sampling the image in the area of the marking, normalizing the sampled area of the marking, comparing the sampled area of the marking with an area of the image free from having the marking, and adding a detected presence of the marking to a bit pattern. The third process additionally comprises calculating an error checking code for the bit pattern to eliminate a false positive.

The fourth process comprises searching a database for the bit pattern. The fourth process also comprises identifying a match exists in the database. The fourth process further comprises outputting a match result indicator to a device associated with the camera.

A further aspect of this description is related to a system comprising a mobile device comprising a processor and a camera. The system also comprises a computer communicatively coupled with the mobile device. The system is configured to process an image captured by the camera. The processing comprises a first process, a second process, a third process and a fourth process.

The first process comprises detecting binary robust invariant scalable key points in the image. The first process also comprises rough matching on the key points using a fast library for approximate nearest neighbors method to generate rough matches. The first process further comprises filtering the rough matches. The first process additionally comprises picking a quantity of rough matches identified as being within a predetermined threshold of a match and storing the rough matches identified as being within the predetermined threshold of the match as potential targets in a database. The first process also comprises running a fine match on the key points using the potential targets to generate fine matches. The first process further comprises calculating first homographies for the fine matches. The first process additionally comprises filtering the first homographies. The first process also comprises running a first mark reading process.

The second process comprises generating one or more first optical flow pyramids based on the potential targets using a lower resolution version of the potential targets. The second process also comprises warping the image into one or more planar views of the potential targets. The second process further comprises generating a second optical flow pyramid of the warped image, and normalizing one or more layers of the second optical flow pyramid. The second process further comprises identifying the key points in the lower resolution of the potential targets. The second process additionally comprises identifying where the key points are located in the warped image. The second process also comprises determining the key points moved between one or more of the first optical flow pyramids and the second optical flow pyramid by running an optical flow calculation and filter the determined movements. The second process further comprises calculating a second homography based on the determined movements and running a second mark reading process.

The third process comprises determining mark layout information for the potential targets. The third process also comprises generating a fine approximation for each marking in the mark layout. The third process further comprises, for each marking, sampling the image in the area of the marking, normalizing the sampled area of the marking, comparing the sampled area of the marking with an area of the image free from having the marking, and adding a detected presence of the marking to a bit pattern. The third process additionally comprises calculating an error checking code for the bit pattern to eliminate a false positive.

The fourth process comprises searching a database for the bit pattern. The fourth process also comprises identifying a match exists in the database. The fourth process further comprises outputting a match result indicator to the mobile device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A card, comprising:
   a substrate having a first surface and a second surface opposite the first surface, the first surface having a first surface area;
   an image area on the first surface, the image area having a second surface area less than the first surface area;
   a contrast region between the image area and an edge of the substrate, the contrast region being a solid border surrounding the image area; and
   a plurality of markings extending from the contrast region into the image area, each marking of the plurality of markings being arranged in a pattern such that the markings of the plurality of markings are separated from one another by a portion of the image area,
   wherein each marking of the plurality of markings is an irregular hexagon, comprising:
      a first side and a second side parallel to the first side, the first side and the second side having equal lengths extending in a first direction from the contrast region into the image area;
      a third side and a fourth side parallel to the third side, the third side and the fourth side extending in a second direction different from the first direction, the third side connecting the first side with the second side and having a length greater than a length of the fourth side;
      a fifth side connecting the first side with the fourth side; and
      a sixth side connecting the second side with the fourth side.

2. The card according to claim 1, wherein the contrast region is a solid pattern having a color and the markings of the plurality of markings have an identical solid pattern and color as the contrast region.

3. The card according to claim 1, wherein a center of the third side is aligned with a center of the fourth side in a direction perpendicular to the third side.

4. The card according to claim 1, wherein the card has at least three sides, and the markings of the plurality of markings are arranged along one of the at least three sides.

5. The card according to claim 1, wherein the card has at least three sides, and the markings of the plurality of markings are arranged along each of the at least three sides.

6. The card according to claim 5, wherein the markings of the plurality of markings are divided into at least three subsets that each correspond to one of the at least three sides.

7. The card according to claim 6, wherein the pattern of the markings of the plurality of markings included in each of the at least three subsets is identical among the at least three subsets.

8. The card according to claim 6, wherein the pattern of the markings of the plurality of markings included in each of the at least three subsets is different among at least two of the at least three subsets.

9. The card according to claim 8, wherein the pattern of the markings of the plurality of markings included in each of the at least three subsets is different among each of the at least three subsets.

10. A method, comprising:
    processing an image captured by a camera, the processing comprising:
    a first process comprising:
       detecting binary robust invariant scalable key points in the image;
       rough matching on the key points using a fast library for approximate nearest neighbors method to generate rough matches;
       filtering the rough matches;
       picking a quantity of rough matches identified as being within a predetermined threshold of a match and storing the rough matches identified as being within the predetermined threshold of the match as potential targets in a database;
       running a fine match on the key points using the potential targets to generate fine matches;
       calculating first homographies for the fine matches;
       filtering the first homographies; and
       running a first mark reading process;
    a second process comprising:
       generating one or more first optical flow pyramids based on the potential targets using a lower resolution version of the potential targets;
       warping the image into one or more planar views of the potential targets;
       generating a second optical flow pyramid of the warped image, and normalizing one or more layers of the second optical flow pyramid;
       identifying the key points in the lower resolution of the potential targets;
       identifying where the key points are located in the warped image;
       determining the key points moved between one or more of the first optical flow pyramids and the second optical flow pyramid by running an optical flow calculation and filter the determined movements; and
       calculating a second homography based on the determined movements and running a second mark reading process;
    a third process comprising:
       determining mark layout information for the potential targets;
       generating a fine approximation for each marking in the mark layout;
       for each marking, sampling the image in the area of the marking, normalizing the sampled area of the marking, comparing the sampled area of the marking with an area of the image free from having the marking, and adding a detected presence of the marking to a bit pattern; and
       calculating an error checking code for the bit pattern to eliminate a false positive; and
    a fourth process comprising:
       searching a database for the bit pattern;
       identifying a match exists in the database; and
       outputting a match result indicator to a device associated with the camera, wherein the device associated with the camera is configured to initiate the first process, the second process or the third process based on a detection of a card, comprising:
a substrate having a first surface and a second surface opposite the first surface, the first surface having a first surface area;
an image area on the first surface, the image area having a second surface area less than the first surface area;
a contrast region between the image area and an edge of the substrate, the contrast region being a solid border surrounding the image area; and
a plurality of markings extending from the contrast region into the image area, each marking of the plurality of markings being an irregular hexagon and arranged in a pattern such that the markings of the plurality of markings are separated from one another by a portion of the image area, and
wherein each marking of the plurality of markings comprises:
a first side and a second side parallel to the first side, the first side and the second side having equal lengths extending in a first direction from the contrast region into the image area;
a third side and a fourth side parallel to the third side, the third side and the fourth side extending in a second direction different from the first direction, the third side connecting the first side with the second side and having a length greater than a length of the fourth side;
a fifth side connecting the first side with the fourth side; and
a sixth side connecting the second side with the fourth side.

11. The method according to claim 10, wherein the first process and the second process are run in series.

12. The method according to claim 10, wherein the first process is faster than the second process.

13. The method according to claim 10, wherein the first process, the second process and the third process are performed by the device associated with the camera and the fourth process is performed by a computer communicatively coupled with the device associated with the camera.

14. A system comprising:
a mobile device comprising a processor and a camera; and
a computer communicatively coupled with the mobile device, wherein the system is configured to perform:
processing an image captured by the camera, the processing comprising:
a first process comprising:
detecting binary robust invariant scalable key points in the image;
rough matching on the key points using a fast library for approximate nearest neighbors method to generate rough matches;
filtering the rough matches;
picking a quantity of rough matches identified as being within a predetermined threshold of a match and storing the rough matches identified as being within the predetermined threshold of the match as potential targets in a database;
running a fine match on the key points using the potential targets to generate fine matches;
calculating first homographies for the fine matches;
filtering the first homographies; and
running a first mark reading process;
a second process comprising:
generating one or more first optical flow pyramids based on the potential targets using a lower resolution version of the potential targets;
warping the image into one or more planar views of the potential targets;
generating a second optical flow pyramid of the warped image, and normalizing one or more layers of the second optical flow pyramid;
identifying the key points in the lower resolution of the potential targets;
identifying where the key points are located in the warped image;
determining the key points moved between one or more of the first optical flow pyramids and the second optical flow pyramid by running an optical flow calculation and filter the determined movements; and
calculating a second homography based on the determined movements and running a second mark reading process;
a third process comprising:
determining mark layout information for the potential targets;
generating a fine approximation for each marking in the mark layout;
for each marking, sampling the image in the area of the marking, normalizing the sampled area of the marking, comparing the sampled area of the marking with an area of the image free from having the marking, and adding a detected presence of the marking to a bit pattern; and
calculating an error checking code for the bit pattern to eliminate a false positive; and
a fourth process comprising:
searching a database for the bit pattern;
identifying a match exists in the database; and
outputting a match result indicator to the mobile device,
wherein the mobile device is configured to initiate the first process, the second process or the third process based on a detection of a card, comprising:
a substrate having a first surface and a second surface opposite the first surface, the first surface having a first surface area;
an image area on the first surface, the image area having a second surface area less than the first surface area;
a contrast region between the image area and an edge of the substrate, the contrast region being a solid border surrounding the image area; and
a plurality of markings extending from the contrast region into the image area, each marking of the plurality of markings being an irregular hexagon and arranged in a pattern such that the markings of the plurality of markings are separated from one another by a portion of the image area, and
wherein each marking of the plurality of markings comprises:
a first side and a second side parallel to the first side, the first side and the second side having equal lengths extending in a first direction from the contrast region into the image area;
a third side and a fourth side parallel to the third side, the third side and the fourth side extending in a second direction different from the first direction, the third side connecting the first side with the second side and having a length greater than a length of the fourth side;

a fifth side connecting the first side with the fourth side; and a sixth side connecting the second side with the fourth side.

15. The system according to claim 14, wherein the first process and the second process are performed in series.

16. The system according to claim 14, wherein the first process is faster than the second process.

17. The system according to claim 14, wherein the first process, the second process and the third process are performed by the mobile device and the fourth process is performed by the computer.

\* \* \* \* \*